No. 668,404. Patented Feb. 19, 1901.
O. B. H. HANNEBORG.
APPARATUS FOR TRANSMITTING SUNLIGHT TO BASEMENTS OR OTHER STORIES.
(Application filed Feb. 26, 1900.)
(No Model.)
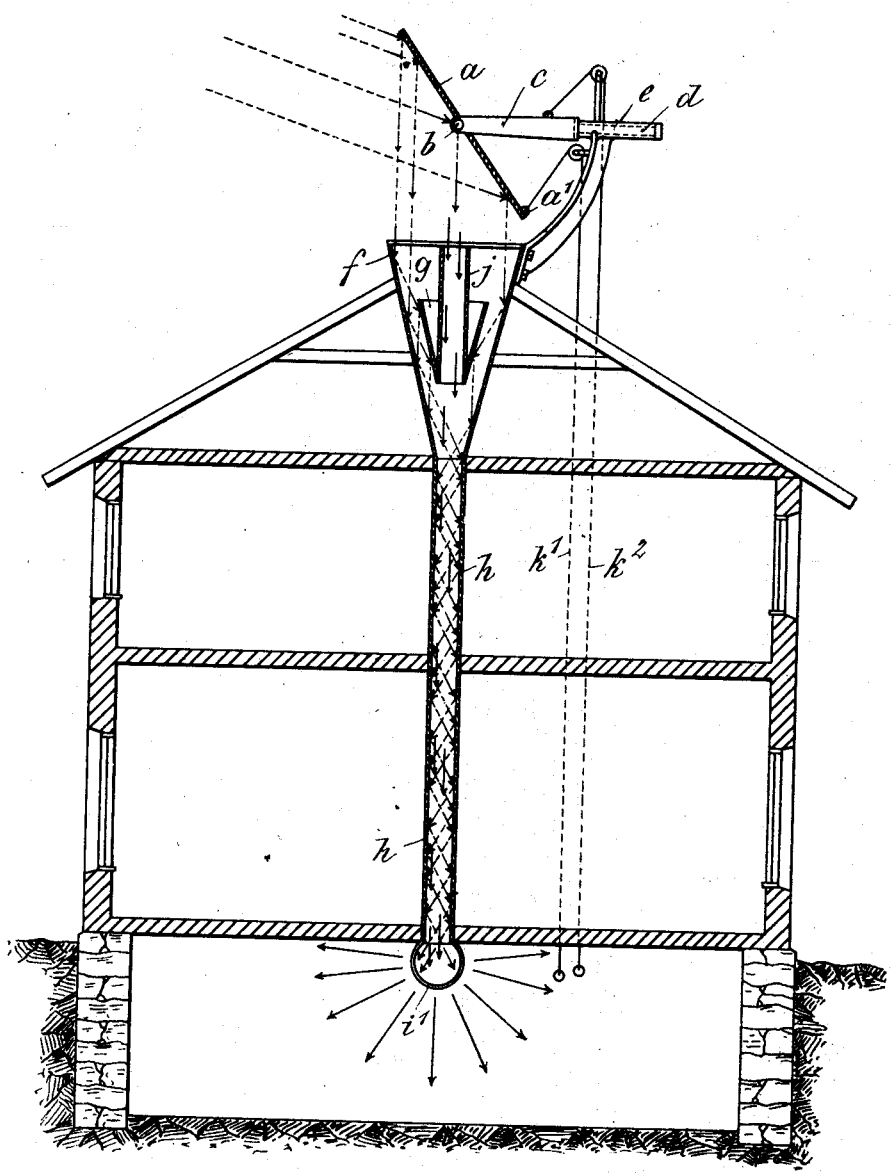
Witnesses:
Ella L Giles
Oldrunn
Inventor:
O. B. H. Hanneborg.
per
Attorneys

UNITED STATES PATENT OFFICE.

ODILON BALTZAR HANNIBAL HANNEBORG, OF CHRISTIANIA, NORWAY.

APPARATUS FOR TRANSMITTING SUNLIGHT TO BASEMENTS OR OTHER STORIES.

SPECIFICATION forming part of Letters Patent No. 668,404, dated February 19, 1901.

Application filed February 26, 1900. Serial No. 6,637. (No model.)

*To all whom it may concern:*

Be it known that I, ODILON BALTZAR HANNIBAL HANNEBORG, a citizen of the Kingdom of Norway, residing at Christiania, Norway, have made certain new and useful Improvements in Apparatus for Transmitting Sunlight to the Basement or other Stories in Houses, of which the following is a specification.

The object of my invention is to collect the rays from the sun or other sources and to convey them to the cellar or other rooms in buildings, where they may be utilized in the form of light or transformed into heat or decomposed by prisms in different colors and utilized for different purposes.

The apparatus can of course, besides being used in buildings, also be used in mines, forts, vessels, and in general in such places where direct light cannot otherwise reach.

The invention is illustrated in the accompanying drawing, wherein the figure shows a building where the light-collector is placed on top of the roof and connected by a vertical light-conveyer to the cellar, where a light-distributer is placed for lighting this room.

The light-collector, as shown by the figure, consists of a mirror $a$, pivoted at $b$ in the fork $c$, which on its axis $d$ can be turned in the solid bearing $e$. The mirror $a$ will, when properly set against the sun or other light-producers, reflect the rays to the funnel-shaped collector $f$, which on its inside is bright like a mirror and provided with another funnel of glass $g$, which funnel $g$ helps to throw the reflected rays down the funnel $f$ to the vertical light-conductor $h$, which also is bright like a mirror. At the lower extremity is placed a a globe of milk-glass $i'$, into which the rays reach and by which they are spread in the cellar. Considerable light is also reflected by the mirrors $a$ directly and vertically down the tube $j$ and conveyer $h$, as shown by the arrows on the drawing. The mirror $a$ must of course, if the light from the sun is to be used, be moved in accordance with the sun either by watch mechanism or by hand, such as shown by the figure, where the cords $k'\ k^2$ are connected in such a manner to the mirror $a$ and the fork $c$ that the mirror can be held at any angle in relation to the source of light, and so that the rays will reflect vertically down the funnel-shaped light-collector $f$. For this purpose the mirror is provided with a weight at $a'$, and the axis $d$ is acted on by a spring in order that the axis, by means of the spring and the cords $k^2$, may be turned in both directions. If the cords $k'\ k^2$ are operated by a watch mechanism adjusted in accordance with the movement of the sun, the described arrangement may very well be used for transmission of sunlight.

Having now particularly described and ascertained the nature of my said invention and in what manner the same is to be performed, I declare that what I claim is—

In combination, the conductor $h$, the funnel-shaped mirror forming a continuation thereof, a second funnel-shaped mirror within said first-named mirror, and a plain mirror adjustably mounted above said funnel-shaped mirrors, substantially as described.

In witness whereof I have hereunto set my hand in presence of two witnesses.

ODILON BALTZAR HANNIBAL HANNEBORG.

Witnesses:
 AXEL LAHN,
 HENRY BORDEWICH.